United States Patent [19]

Johannesen

[11] 4,109,765

[45] Aug. 29, 1978

[54] MECHANICALLY ACTUATED DISC BRAKE

[75] Inventor: Donald Dixon Johannesen, South Bend, Ind.

[73] Assignee: The Bendix Corporation, Southfield, Mich.

[21] Appl. No.: 741,655

[22] Filed: Nov. 15, 1976

Related U.S. Application Data

[63] Continuation of Ser. No. 564,507, Apr. 2, 1975, abandoned.

[51] Int. Cl.² ............................................. F16D 55/08
[52] U.S. Cl. .................................. 188/72.7; 188/72.9
[58] Field of Search .................... 188/72.1, 72.6, 72.7, 188/72.9, 106 F, 106 P; 192/93 R

[56] References Cited

U.S. PATENT DOCUMENTS

| 2,462,284 | 2/1949 | Rauch | 188/72.7 |
| 3,406,793 | 10/1968 | Buyze | 188/72.9 |
| 3,410,372 | 11/1968 | Hodkinson et al. | 188/72.6 |
| 3,954,158 | 5/1976 | Rist | 188/72.9 |

FOREIGN PATENT DOCUMENTS

| 1,406,826 | 6/1965 | France | 188/72.7 |
| 673,667 | 11/1964 | Italy | 188/72.7 |

Primary Examiner—Edward R. Kazenske
Attorney, Agent, or Firm—Ken C. Decker; William N. Antonis

[57] ABSTRACT

A mechanical actuator for a disc brake is disclosed which provides an improved actuating mechanism which is less expensive and more reliable than prior art mechanical disc brake actuators. The actuator includes a lever which is provided with arcuate camming surfaces on opposite sides thereof. One of the camming surfaces is adapted to rollingly engage a substantially flat insert carried by the caliper housing. The camming surface on the opposite edge of the lever is substantially circular and is defined within a recess on the edge of the lever. Opposite ends of the camming surface terminate in depressions which are adapted to receive a spherical force transmitting element. A force transmitting member slidably mounted within the caliper housing interconnects the force transmitting element with the friction pad of the disc brake. The force transmitting element is disposed in one of the depressions when the brake is released. When a brake application is effected, the lever is rocked about the camming surface engaging the substantially flat insert, and consequently drives the spherical force transmitting element out of its depression, across the camming surface, and towards the other depression. As the spherical force transmitting element is rocked across the camming surface, the force transmitting member is urged toward the brake rotor, consequently forcing the corresponding friction elements into frictional engagement with the rotor to effect a brake application.

7 Claims, 1 Drawing Figure

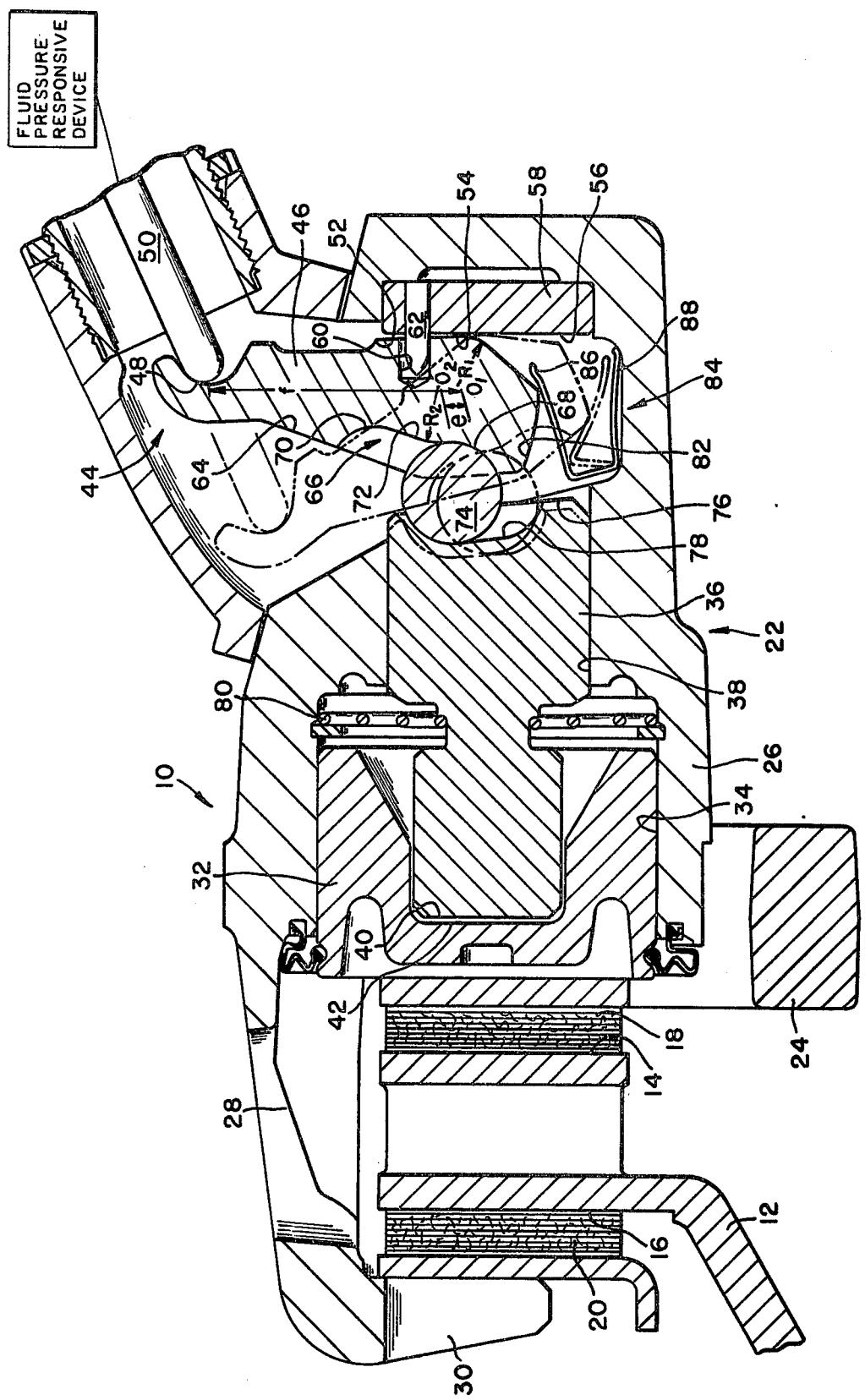

MECHANICALLY ACTUATED DISC BRAKE

This is a continuation of U.S. Pat. Application Ser. No. 564,507, filed Apr. 2, 1975, and now abandoned.

BACKGROUND OF THE INVENTION

This invention relates to mechanical actuating mechanism for an automotive disc brake assembly.

Most existing disc brakes are actuated directly by hydraulic pressure, and consequently, most disc brakes are currently used on automobiles or relatively small trucks which are equipped with hydraulic brakes. Furthermore, since no reliable parking actuator has yet been developed for widespread use in automotive vehicles, most disc brakes currently are used only on the front wheels of the vehicle, so the rear wheels of the vehicle may be equipped with a drum brake provided with a parking actuator. Consequently, it is desirable to develop a reliable mechanical actuator for a disc brake, not only so that existing hydraulic disc brakes can be provided with a parking actuator but also because a reliable mechanical actuator will permit disc brakes to be actuated by air pressure. Since most large commercial vehicles are equipped with air brake systems, it is desirable to provide a heavy duty disc brake which may be actuated by air pressure. Since air systems generally generate much lower pressure levels than existing hydraulic systems, an air-actuated disc brake must be provided with an efficient, mechanical, force multiplying mechanism so that sufficient braking torque can be generated. Existing mechanical disc brake actuators, for the most part, have been relatively expensive, difficult to manufacture, and otherwise troublesome.

SUMMARY OF THE INVENTION

Therefore, an important object of my invention is to design a mechanical actuator for automotive disc brakes in which all contact between the actuating portion of the mechanism and the stationary portion is rolling contact, so that no thrust bearings will be required to minimize friction.

Another important object of my invention is to design a mechanical actuator for an automotive disc brake which requires only a minimum number of simple machine cuts to manufacture.

Another important object of my invention is to provide a mechanical actuator for a disc brake which is inherently self aligned, so that close manufacturing tolerances are not required in order to assure proper assembly of the device.

Another important object of my invention is to provide a mechanically actuated disc brake which includes a lever which actuates a ball-and-cam actuator, but in which the camming surfaces are simple radiuses instead of relatively complicated arcuate surfaces which are required in prior art devices.

DESCRIPTION OF THE DRAWING

The sole FIGURE of the drawing is a longitudinal cross sectional view taken through a disc brake assembly including a mechanical actuator made pursuant to teachings of my present invention.

DETAILED DESCRIPTION

Referring now to the drawing, a disc brake generally indicated by the numeral 10 includes a rotor 12 having a pair of friction faces 14 and 16. A pair of friction elements 18, 20 are carried adjacent the friction faces 14 and 16 of the rotor 12, respectively, and are adapted to be thrust into frictional engagement with the faces 14 and 16 when a brake application is effected. The brake 10 further includes a caliper housing generally indicated by the numeral 22 which is slidably mounted on a fixed support member 24. The fixed support member 24 is rigidly mounted to a nonrotative portion of the vehicle (such as the spindle housing), and the caliper 22 may be slidably mounted on the fixed support member 24 by any suitable manner, such as the manner disclosed in U.S. Pat. No. 3,388,774, owned by the assignee of the present invention and incorporated herein by reference.

The caliper 22 includes an actuator housing 26 which extends generally parallel to the friction face 14 of the rotor 12, a bridge portion 28 which extends across the periphery of the rotor 12, and a radially inwardly extending portion 30 which extends generally parallel to the friction face 16. The friction element 20 is mounted on the inwardly extending portion 30 of the caliper 22, and the friction element 18 anchors against a portion of the torque member 24 as is more completely described in the aforementioned U.S. patent, but is also engaged by a piston 32. Piston 32 is slidably mounted in a larger diameter bore 34 which is defined within the actuator housing 26. A force transmitting member 36 is slidably mounted in a smaller diameter bore 38 which is also defined within the housing 26. The force transmitting member 36 projects into the larger diameter bore 34 and terminates in a front face 40 which is adapted to engage the rear face 42 of the piston 32 to thrust the latter, and therefore the friction element 18, toward the rotor friction face 14. After contact of the friction face 14 by the friction element 18, reaction forces due to the slidable mounting of the caliper housing 22 acting through the bridge portion 28 and the inwardly extending portion 30 will also thrust the friction element 20 into braking engagement with the friction face 16, thereby effecting a brake application. Of course, if necessary, the force transmitting member 36 and the piston 32 may be fitted with an appropriate automatic adjustment mechanism, such as the mechanism disclosed in copending U.S. Patent Application No. 544,511, filed Apr. 2, 1975, now U.S. Pat. No. 3,967,705 to thereby limit retraction of the friction elements 18 and 20 upon brake release to a constant predetermined amount.

The brake assembly 10 further includes a mechanical actuating assembly generally indicated by the numeral 44. The assembly 44 includes a lever 46 which is provided with a socket 48 at one end thereof which receives an appropriate actuating device, such as the push rod 50 of a conventional pneumatic actuator of any type well known to those skilled in the art. In the alternative, the socket 48 may receive a cable connector so that the mechanical actuating device 44 may be used as a parking brake in a disc brake assembly actuated by hydraulic pressure. The edge 52 of the lever 46 is provided with a radiused camming surface 54 which is designed to rollingly engage the substantially flat surface 56 of a hardened insert 58 which is secured to the caliper housing 22. The camming surface 54 is a segment of a circular arc, having a center at $O_1$ and a radius $R_1$. The edge 52 of the lever 46 is also provided with a cavity 60 which receives a pin 62 with substantial clearance to hold the lever 46 in the position illustrated in the drawing when the brake is released. The opposite edge 64 of the lever 46 is provided with a recess generally indicated by the numeral 66. The bottom of the recess 66 defines a pair of arcuate depressions 68, 70 which are interconnected by an arcuate camming surface 72. The camming surface 72, like the camming surface 54, is a simple circular arc having a center at $O_2$ and a radius $R_2$. It will be noted that the center $O_2$ of the circular arc 72 is offset from the center $O_1$ of the circular arc comprising camming surface 54 by a very small amount $e$. When the lever 46 is disposed in the brake release position illustrated in the drawing, a substantially spherical rolling force transmitting element 74 is disposed in the depression 68. The right hand face (viewing the FIGURE) of the force transmitting member 36 is generally indicated by the numeral 76 and is provided with an elongated recess 78. The force transmitting element 74 is received in the recess 78, which is substantially longer than the diameter of the element 74, and also in the depression 68 in the lever 46. A spring 80 yieldably urges the force transmitting member 36 to the right, viewing the FIGURE, to thereby hold the force transmitting element 74 in its position illustrated in the drawing.

The lever 46 is also provided with a connecting edge 82 which joins the edges 52 and 64. A leaf spring generally indicated by the numeral 84 is provided with an arm 86 which engages the connecting edge 82 of the lever 46 and a second arm 88 which engages the wall of the housing 26. The spring 84 yieldably urges the lever 46 to the brake release position illustrated by the solid lines in the drawing. It will be noted that the spring 84 also rocks the lever 46 in a clockwise direction upon release of the brakes to thereby permit the pin 62 to re-engage the cavity 60 after the cavity 60 is moved out of engagement with pin 62 upon a brake application.

MODE OF OPERATION

The positions of the various components of the actuating mechanism 44 are illustrated in solid lines in the position which they assume when the brake is released and in the phantom lines in the positions which they assume during a full brake application. When a brake application is effected, the push rod 50 is stroked in a direction generally to the left viewing the FIGURE, thereby rocking the lever 46 about the insert 58 on the camming surface 54 in a generally counterclockwise direction. As the lever 46 rocks about the camming surface 54, the force transmitting element 74 will be driven out of the depression 68 and over the camming surface 72, thereby forcing the element 74 downwardly and to the left, viewing the FIGURE, so that it assumes the position illustrated in the phantom lines in the FIGURE. As the element 74 is forced across the camming surface 72, the force transmitting element 36 is driven to the left viewing the FIGURE, thereby driving the friction elements 18 and 20 into braking engagement with their corresponding friction faces 14 and 16 in a manner described in detail hereinabove. It will be noted that, because of the forces acting on the lever 46, the force urging the force transmitting member 36 to the left viewing the drawings will be many times the force applied to the lever by the push rod 50. This occurs because the offset $e$ between the center $O_1$ and $O_2$, which defines the lever arm acting on the force transmitting element 36, is only a very small fraction of the distance $f$ between the socket 48 and the center $O_1$. Since the lever ratio of the lever mechanism 46 is the ratio of $f$ divided by $e$, this ratio will be relatively large, thereby assuring a relatively large force multiplying effect across the lever 46. This provides an extremely efficient brake actuator which can generate the necessary braking forces from the air pressure forces generated in the aforementioned air pressure actuator (not shown). As described hereinabove, on release of the brakes, the springs 84 and 80 return the members to the position illustrated in solid lines in the drawing. Engagement of the pin 62 with the cavities 60 as also discussed hereinabove, assures proper alignment of the lever mechanism 46 during brake release.

I claim:
1. In a disc brake:
a rotor having a pair of friction faces;
a pair of friction elements, one of said elements being disposed adjacent each of said friction faces;
a fixed support;
a caliper slidably mounted on said fixed support and straddling said rotor, said caliper engaging each of said friction elements for urging the latter into braking engagement with their corresponding friction faces when a brake application is effected;
said caliper including a housing and actuating means for effecting a brake application, said actuating means including a force transmitting member slidably mounted in said housing and adapted to engage one of said friction elements, a lever disposed within said housing and having a pair of camming surfaces, said camming surfaces being non-rotatable with respect to said lever, one of said camming surfaces being in rolling contact with a wall of said housing so that said one camming surface rolls relative to said housing and said lever pivots about a pivot point on said one camming surface, the position of said pivot point moving with respect to said housing as said one camming surface rolls on said wall of said housing, means operably connecting the other camming surface to said force transmitting member to urge the latter toward said rotor upon rolling of said one camming surface relative to said housing whereby said force transmitting member drives said friction elements into braking engagement with their corresponding friction faces to thereby effect a brake application, and means to actuate said lever;
said lever being actuable from a brake-released to a brake-applied condition, said camming surfaces being defined on opposite edges of one end of the lever;
said one camming surface defined on one edge of said lever being an arcuate curve adapted to engage the wall of said caliper;
said other camming surface being defined on the other edge of said lever and being disposed adjacent an arcuate depression, said means operably connecting said other camming surface to the force transmitting member including an element engaging said force transmitting member, said lever forcing said element out of said depression and against said other camming surface when the lever is actuated to thereby urge the force transmitting member toward the rotor.
2. The invention of claim 1:
said force transmitting member presenting a surface facing said depression and said other camming surface;
said surface defining a cavity therewithin for receiving said element.
3. The invention of claim 2:
said element being spheroidal.
4. The invention of claim 1:

one end of said other camming surface extending from the edge of said depression and the other end of said other camming surface terminating in a second depression:

said element being forced out of the first-mentioned depression and over said other camming surface and into the last-mentioned depression as said lever is actuated.

5. The invention of claim 4:

both of said depressions and the other camming surface being defined within a recess on said other edge of said lever.

6. The invention of claim 4:

said force transmitting member presenting a surface facing said depressions and said other camming surface;

said surface defining an elongated cavity therewithin for receiving said element, said element being substantially spherical, said cavity being longer than the diameter of the sphere.

7. In a disc brake:

a rotor having a pair of friction faces;

a pair of friction elements, one of said elements being disposed adjacent each of said friction faces;

a fixed support;

a caliper slidably mounted on said fixed support and straddling said rotor, said caliper engaging each of said friction elements for urging the latter into braking engagement with their corresponding friction faces when a brake application is effected;

said caliper including a housing and actuating means for effecting a brake application, said actuating means including a force transmitting member slidably mounted in said housing and adapted to engage one of said friction elements, a lever disposed within said housing and having a pair of camming surfaces, said camming surfaces being non-rotatable with respect to said lever, one of said camming surfaces being in rolling contact with a wall of said housing so that said one camming surface rolls relative to said housing and said lever pivots about a pivot point on said one camming surface, the position of said pivot point moving with respect to said housing as said one camming surface rolls on said wall of said housing, means operably connecting the other camming surface to said force transmitting member to urge the latter toward said rotor upon rolling of said one camming surface relative to said housing whereby said force transmitting member drives said friction elements into braking engagement with their corresponding friction faces to thereby effect a brake application, and means to actuate said lever;

said lever being actuable from a brake-released to a brake-applied condition, said camming surfaces being defined on opposite edges of one end of the lever;

resilient means yieldably urging said lever toward the brake-released condition;

said lever further defining a connecting edge joining said opposite edges;

said resilient means engaging said connecting edge;

said resilient means being a leaf spring presenting a pair of arms;

one of said arms engaging the wall of said caliper housing, the other arm engaging said connecting edge of said lever.

* * * * *